US009742663B2

(12) United States Patent
Mahadevan et al.

(10) Patent No.: US 9,742,663 B2
(45) Date of Patent: *Aug. 22, 2017

(54) SYSTEM AND METHOD FOR REDUCING INFORMATION LOSS IN AN AGGREGATED INFORMATION HANDLING SYSTEM

(71) Applicant: Dell Products L.P., Round Rock, TX (US)

(72) Inventors: Ramasubramani Mahadevan, Tamilnadu (IN); Shivakumar Sundaram, Tamilnadu (IN); Pathangi Narasimhan Janardhanan, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,698

(22) Filed: Jun. 2, 2016

(65) Prior Publication Data

US 2016/0277286 A1  Sep. 22, 2016

Related U.S. Application Data

(63) Continuation of application No. 14/703,657, filed on May 4, 2015, now Pat. No. 9,391,877, which is a continuation of application No. 13/439,641, filed on Apr. 4, 2012, now Pat. No. 9,054,958.

(51) Int. Cl.
*G06F 15/16* (2006.01)
*H04L 12/707* (2013.01)
(Continued)

(52) U.S. Cl.
CPC .......... *H04L 45/22* (2013.01); *H04L 41/0663* (2013.01); *H04L 41/0672* (2013.01);
(Continued)

(58) Field of Classification Search
CPC ......... H04L 45/22; H04L 67/10; H04L 67/16; H04L 45/245; H04L 41/0663;
(Continued)

(56) References Cited

U.S. PATENT DOCUMENTS 6,765,866 B1  7/2004 Wyatt
7,414,985 B1  8/2008 Tedijanto et al.
(Continued)

OTHER PUBLICATIONS

NPL: Web document http://www.ieee802.org/1/files/public/docs2011/maint-lynch-LLDP-over-LAG-0911-v1.pdf, Congdon et al. "Issues with LLDP over LAGs", Slide 6, Sep. 2011.
(Continued)

*Primary Examiner* — Padma Mundur
(74) *Attorney, Agent, or Firm* — Haynes and Boone, LLP

(57) ABSTRACT

An information handling system is provided. The information handling system includes a plurality of aggregation devices configured to distribute information in a virtual link trunk and a plurality of nodes coupled to the aggregation devices. When one of the plurality of aggregation devices received a reboot command, that aggregation device is configured to transmit a first message to the nodes indicating that the aggregation device is rebooting, receive a first acknowledgement message from the nodes indicating that they will not send any information to the rebooting aggregation device. The aggregation device is then configured to reboot, receive a second message from the nodes indicating the nodes are ready to receive information from the rebooted aggregation device, transmit a second acknowledgement message to the nodes indicating that the rebooted aggregation device has rebooted and is capable of receiving information, and receive information from at least one of the nodes for transmission to at least one other node.

20 Claims, 8 Drawing Sheets

(51) Int. Cl.
*H04L 12/24* (2006.01)
*H04L 12/709* (2013.01)
*H04L 29/08* (2006.01)

(52) U.S. Cl.
CPC ............ *H04L 41/12* (2013.01); *H04L 45/245* (2013.01); *H04L 67/10* (2013.01); *H04L 67/16* (2013.01); *Y02B 60/33* (2013.01); *Y02B 60/43* (2013.01)

(58) Field of Classification Search
CPC ..... H04L 41/0672; H04L 41/12; Y02B 60/33; Y02B 60/43
See application file for complete search history.

(56) References Cited

U.S. PATENT DOCUMENTS

| | | |
|---|---|---|
| 7,869,432 B1 | 1/2011 | Mollyn |
| 7,940,661 B2 | 5/2011 | Ervin et al. |
| 2003/0097470 A1* | 5/2003 | Lapuh ................... H04L 45/245 709/239 |
| 2005/0007951 A1* | 1/2005 | Lapuh ..................... H04L 45/00 370/225 |
| 2006/0039384 A1 | 2/2006 | Dontu et al. |
| 2009/0216873 A1* | 8/2009 | Ing ......................... H04L 12/12 709/224 |
| 2010/0067530 A1 | 3/2010 | Arai et al. |
| 2010/0195489 A1 | 8/2010 | Zhou et al. |
| 2011/0051735 A1 | 3/2011 | Matthews et al. |
| 2011/0228767 A1* | 9/2011 | Singla ..................... H04L 49/00 370/389 |

OTHER PUBLICATIONS

NPL: Web document http://www.ieee802.org/3/ad/public/mar99seaman_1_0399.pdf, Mick Seaman, "Link Aggregation Control Protocol", pp. 1-3, Mar. 1999.

* cited by examiner

SYSTEM AND METHOD FOR REDUCING INFORMATION LOSS IN AN AGGREGATED INFORMATION HANDLING SYSTEM

CROSS REFERENCE TO RELATED APPLICATIONS

This application is a continuation of U.S. patent application Ser. No. 14/703,657 filed on May 4, 2015, which is a continuation of U.S. patent application Ser. No. 13/439,641 filed on Apr. 4, 2012 and issued as U.S. Pat. No. 9,054,958 on Jun. 9, 2015, the full disclosures of which are both incorporated by reference herein in their entirety and for all purposes.

BACKGROUND

1. Technical Field

The present disclosure is related to information handling systems. In particular, embodiments disclosed herein are related to preventing information loss in an aggregated information handling system.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

However, certain information handling systems, such as aggregated information handling systems, require each individual aggregate device of the system to be online to maximize information throughput. When any of these individual aggregate devices go offline, information can be lost before the information handling system is able to effectively reroute information to another aggregate device. What is needed is a system and method for reducing information loss in an aggregated information handling system.

SUMMARY

Consistent with some embodiments, there is provided an information handling system. The information handling system includes a plurality of aggregation devices configured to distribute information in a virtual link trunk, a plurality of nodes coupled to the aggregation devices. When one of the plurality of aggregation devices received a reboot command, the one of the plurality of aggregation devices is configured to transmit a first message to the plurality of nodes indicating that the one of the plurality of aggregation devices is rebooting, receive a first acknowledgement message from the plurality of nodes indicating that they will not send any information to the one of the plurality of aggregation devices, reboot, the node then reboots, and then receives a second message from the plurality of nodes indicating the plurality of nodes are ready to receive information from the one of the plurality of aggregation devices, transmit a second acknowledgement message to the plurality of nodes indicating that the one of the plurality of aggregation devices has finished the reboot procedure and capable of receiving information, and receive information from at least one of the plurality of nodes for transmission to at least one other node of the plurality of nodes.

Consistent with some embodiments, there is further provided a method for routing information in an virtual link trunk. The method includes receiving a command for rebooting the aggregation device, sending a first message indicating that the aggregation device is rebooting, and receiving a first acknowledgement messages from the coupled node devices indicating that they will not send any information to the aggregation device. The aggregation device then reboots, and when the reboot is complete, the method also includes receiving a second message from the coupled nodes indicating readiness to receive information from the aggregation device, transmitting a second acknowledgement message to the coupled nodes indicating that the aggregation device has finished the reboot process and is ready to receive information, and receiving information from the coupled nodes for transmission in the virtual link trunk.

These and other embodiments will be described in further detail below with respect to the following figures.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
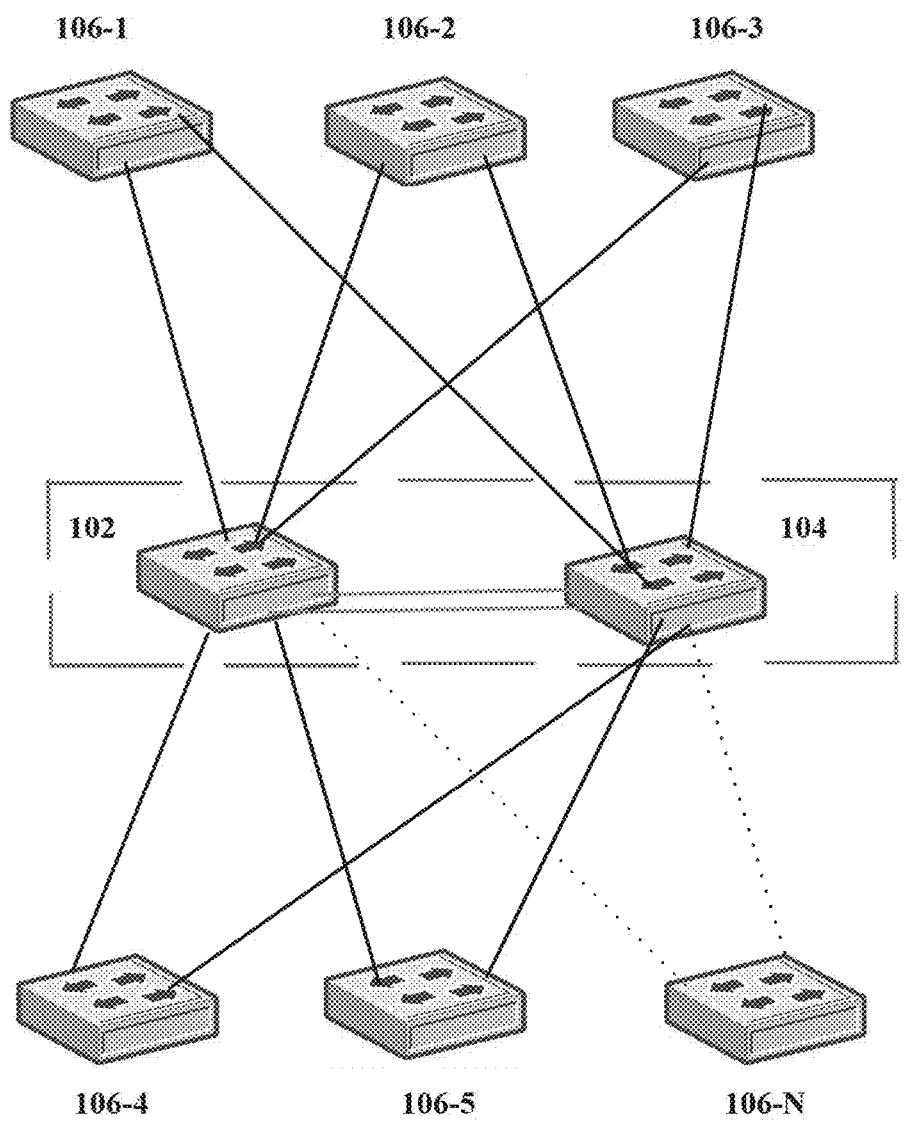
FIG. 1 is an information handling system using link aggregation, across two nodes which together form an aggregate system for the purpose of Link Aggregation, consistent with some embodiments.

FIG. 1 shows an information handling system consistent with some embodiments. As shown in FIG. 1, information handling system 100 includes a first aggregation device 102 and a second aggregation device 104. Consistent with some embodiments, first and second aggregation devices 102 and 104 may be coupled to one another via an inter-chassis link (ICL). First and second aggregation devices 102 and 104 are also coupled to a plurality of downstream nodes 106-1-106-N. The first aggregation device 102 and second aggregation device 104 together provide a view of single logical device to the coupled downstream nodes 106-1 to 106-N. This logical view is restricted to the Link Aggregation at Layer 2 and for all other purposes the two aggregation devices 102 and 104 perform as independent switches. Downstream nodes 106-1 to 106-N treat their links to 102 and 104 as a single logical Link Aggregation Group (LAG), and aggregation devices 102 and 104 treat their connections to each of the downstream nodes 106-1 to 106-N as a logical LAG to the corresponding system. Consistent with some embodiments, first and second aggregation devices 102 and 104 and downstream nodes 106-1-106-N may comprise switches having multiple ports that can be aggregated or trunked in a virtual link trunking arrangement. Consistent with some embodiments, aggregation devices 102 and 104 and downstream nodes 106-1-106-N may include any appropriate combination of hardware and/or software having a processor and capable of reading instructions stored on a non-transitory machine-readable medium for execution by the processor. Consistent with some embodiments aggregation devices 102 and 104 and downstream nodes 106-1-106-N include a machine-readable medium, such as a memory (not shown) that includes instructions for execution by a processor (not shown) for causing aggregation devices 102 and 104 and downstream nodes 106-1-106-N to perform specific tasks. For example, such instructions may include handling and routing information. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Consistent with some embodiments, aggregation devices 102 and 104 can provide static or dynamic LAG to the downstream nodes 106-1 to 106-N. In case of dynamic LAG the devices run link aggregation control protocol (LACP) and the aggregation devices 102 and 104 ensure that the other systems (106-1 to 106-N) see consistent LACP protocol data units (PDU).

When nodes 106-1 to 106-N have information to be sent to the other nodes, they choose the link either to 102 or 104 to send that data. The receiving node (102 or 104) will then forward the data to the destination device and in some cases also forward it to the other node (102 or 104). To avoid situations where both the nodes 102 and 104 forward the data to the devices 106-1 to 106-N, a virtual link trunk (VLT) egress or block mask is in place, which prevents data coming in to 102 (or 104) from the other device to be transmitted out on the links 106-1 to 106-N.

When either first aggregation device 102 or second aggregation device 104 are taken offline for repair or an upgrade, information loss may occur on the information handling system 100 until the other aggregation device detects that a aggregation device is down and reprograms its internal link aggregation (LAG) protocol table to redirect information to the other aggregation device until the first aggregation device 102 or second aggregation device 104 reboots and is brought back online. Moreover, incoming information to the offline aggregation device 102 or 104 may also be lost during the initial transit time until the information is redirected to the other aggregation device. Furthermore, once the offline aggregation device 102 or 104 comes back online, information may be duplicated until the VLT Block Mask is installed for all information over the inter-chassis link. Embodiments as described in FIGS. 2, 3, 5 and 7-9 may provide methods that may reduce or provide zero information loss while the aggregation device 102 or 104 is offline and may be used in arrangements that have both static or dynamic port channels. The mechanisms provided here can be carried using link layer discovery protocol (LLDP) or using link aggregation control protocol (LACP). If the LAG is dynamic, LACP will be used and for static LAG, only LLDP can be used.

Figure 2:
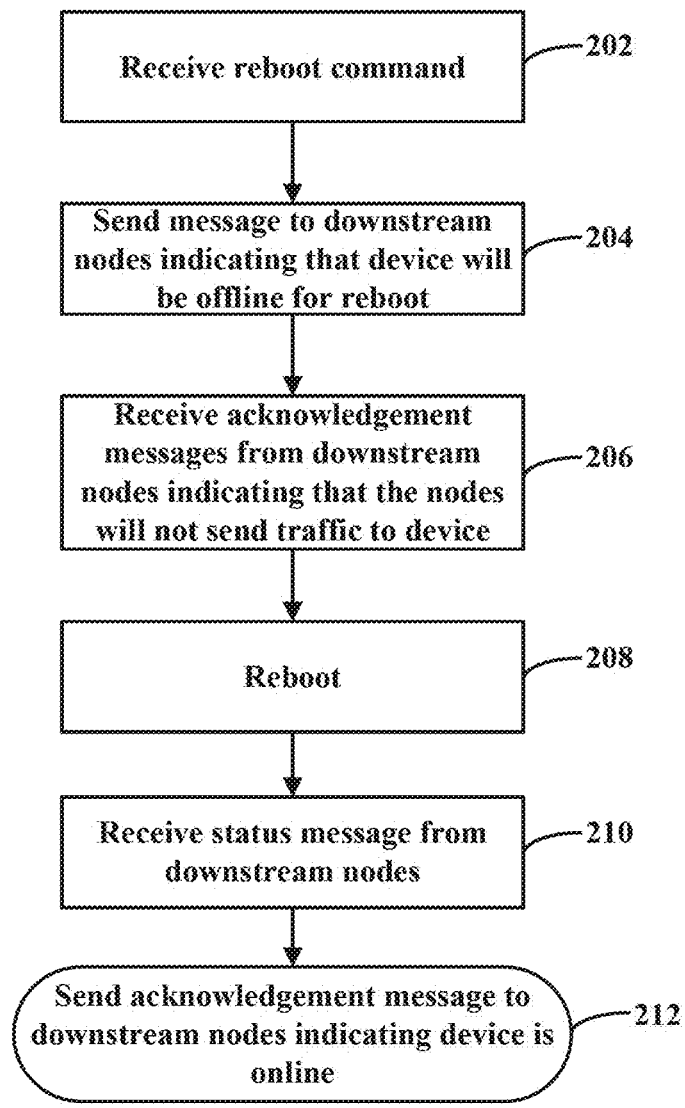
FIG. 2 is method for routing information to ensure proper link states, in an aggregated information handling system to prevent information loss, consistent with some embodiments.

FIG. 2 is method for routing information in an aggregated information handling system to prevent information loss, consistent with some embodiments. FIG. 2 will be described in conjunction with information handling system 100 shown in FIG. 1 for illustration purposes. The method shown in FIG. 2 is directed to the method performed by aggregation device 102 (or 104) that is taken offline. Consistent with some embodiments, aggregation device 102 may include a memory storing instructions that, when executed by a processor of aggregation device 102, allow aggregation device 102 to perform a method such as shown in FIG. 2. As shown in FIG. 2, aggregation device 102 receives a reboot command (step 202). Consistent with some embodiments, the reboot command may be received by aggregation device 202 as a step in an upgrade process. Consistent with some embodiments, the upgrade may be administered to aggregation device 102 or 104 from an administrator. In other embodiments, the reboot command may be received to bring aggregation device 102 back online after it has gone down or offline. Once aggregation device 102 has received the reboot command, aggregation device 102 sends a message to downstream nodes 106-1-106-N, indicating that the unit will be offline for a reboot (step 204). Based on this message, downstream nodes 106-1-106-N will acknowledge that aggregation device 102 will be going offline and a processor of downstream nodes 106-1-106-N will execute instructions stored in a memory of downstream nodes 106-1-106-N to not send any more data to aggregation device 102, and will send all data to aggregation device 104. Aggregation device 102 then receives acknowledgement messages from downstream nodes 106-1-106-N indicating the nodes will not send information to aggregation device 102 (step 206). Aggregation device 102 then reboots and goes offline (step 208). Once the reboot is finished and aggregation device 102 comes back online, it receives status messages from downstream nodes 106-1-106-N indicating that the devices are ready to receive data on the link from aggregation device 102 (step 210). After receiving status message from all coupled nodes, aggregation device 102 will send a message to its peer aggregation device 104, to re-insert the block and also to indicate completion of all information sync across the two devices. It will then transmit acknowledgement messages to downstream nodes 106-1-106-N indicating that the reboot is completed and that aggregation device 102 is online (step 212). Once this status message is received by the nodes 106-1 to 106-N, they will then begin using the link to aggregation device 102 to send data. Although the method described in FIG. 2 is applied to aggregation device 102, it could be applied to aggregation device 104, or any aggregation device in an aggregate group that is being taken offline.

Figure 3:
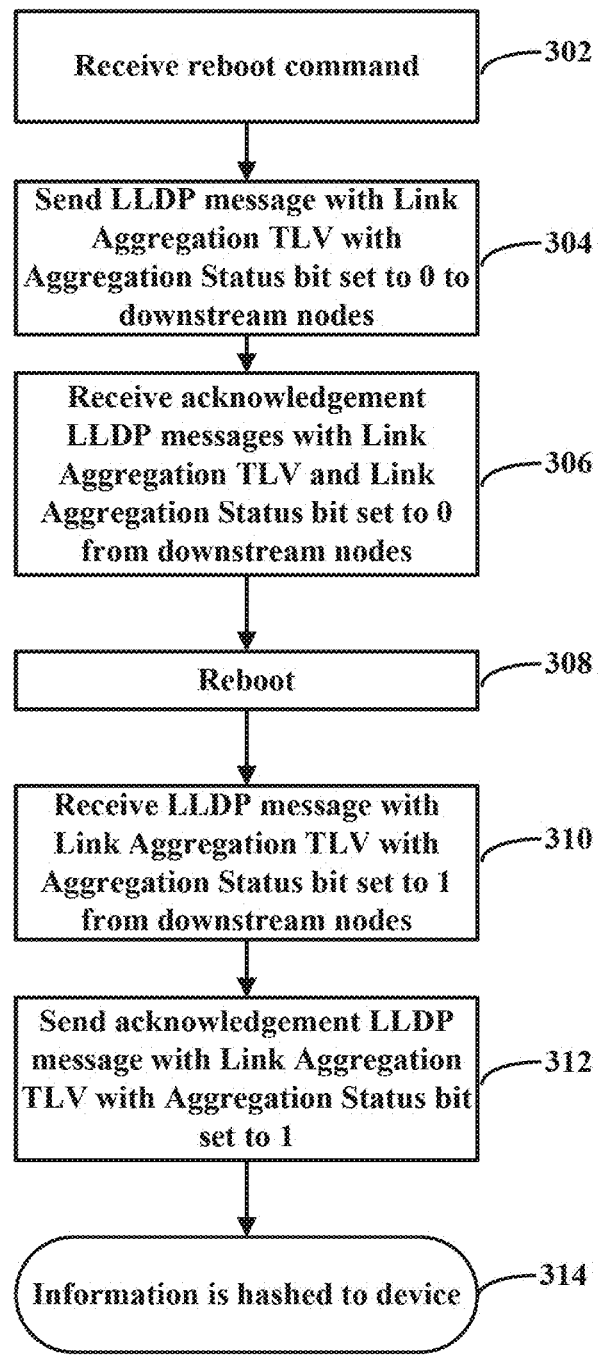
FIG. 3 is a flowchart illustrating a method for routing information in an aggregated information handling system to prevent information loss using LLDP, consistent with some embodiments.

Consistent with some embodiments, the method described in FIG. 2 may be implemented using link layer discovery protocol (LLDP) or link aggregation control protocol (LACP). FIG. 3 is a flowchart illustrating a method for routing information in an aggregated information handling system to prevent information loss using LLDP, consistent with some embodiments. FIG. 3 will be described in conjunction with information handling system 100 shown in FIG. 1 for illustration purposes. The method shown in FIG. 3 is directed to the method performed by the aggregation device 102 that is taken offline. Consistent with some embodiments, aggregation device 102 may include a memory storing instructions that, when executed by a processor of aggregation device 102, allow aggregation device 102 to perform a method such as shown in FIG. 3. As shown in FIG. 3, aggregation device 102 receives a reboot command (step 302). Consistent with some embodiments, the reboot command may be received by aggregation device 102 as a step in an upgrade process. In other embodiments, the reboot command may be received to bring aggregation device 102 back online after it has gone down or offline. Once aggregation device 102 has received the reboot command, it will use a LLDP message to inform downstream nodes 106-1-106-N to reroute information to other aggregation devices such as aggregation device 204. To do this, aggregation device 102 sends an LLDP data unit (DU) message with a Link Aggregation type length value (TLV) with an Aggregation Status bit set to "0" (step 304).

Figure 4:
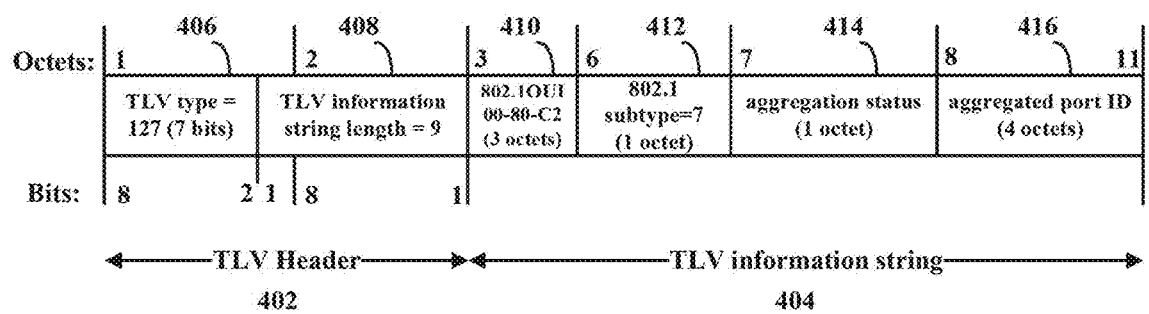
FIG. 4 is an LLDP Link Aggregation TLV, consistent with some embodiments.

FIG. 4 is an LLDP Link Aggregation TLV, consistent with some embodiments. LLDP is a vendor-neutral Link Layer protocol used by network devices and is sometimes referred to by the IEEE 8021.AB standard. As shown in FIG. 4, LLDP Link Aggregation TLV 400 includes a TLV Header segment 402 and a TLV information string segment 404. TLV Header segment 402 includes a TLV type field 406 and a TLV information string length field 408. As shown in FIG. 4, the TLV type is equal to 127 in TLV type field 406 which corresponds to a custom or organizational TLV. TLV information string segment 404 includes an 802.1 organizationally unique identifier (OUI) field 410, an 802.1 subtype field 412, an aggregation status field 414 and an aggregated port identification field 416. Embodiments described herein will primarily make use of aggregation status field 414, as discussed below. Moreover, link aggregation status field 414 may have 8 bits, each of which may have a function determined by its value of "0" or "1" as shown in Table 1, below.

TABLE 1

| Bit | Function | Value/Meaning |
| --- | --- | --- |
| 0 | Aggregation capability | 0 = not capable of being aggregated<br>1 = capable of being aggregated |
| 1 | Aggregation status | 0 = not currently in aggregation<br>1 = currently in aggregation |
| 2-7 | Reserved | |

Returning to FIG. 3, after receiving the LLDP message with a Link Aggregation type length value (TLV) with an Aggregation Status bit set to "0", downstream nodes 106-1-106-N will retain the port for aggregation device 102 as a member of the link aggregation group (LAG) but disable data transmission on the port. Consequently, no information will be sent out of that port by LAG hashing. In particular, the port on which the LLDP message is received will be able to receive information to receive any transient information from aggregation device 102 before it goes offline. Downstream nodes 106-1-106-N then send acknowledgement messages back to aggregation device 102, the acknowledgement messages also being LLDPDU messages with link aggregation TLV and a link aggregation bit set to "0", and information is lag hashed on another port coupled to another aggregation device, for example, aggregation device 104.

The acknowledgement LLDP messages are then received by aggregation device 102 (step 306). Once aggregation device 102 has received acknowledgement LLDP messages from all of downstream nodes 106-1-106-N, aggregation device 102 can reboot and go offline (step 308). After the reboot is complete, aggregation device 102 rejoins the aggregation group but does not immediately transmit information to the group. Consistent with some embodiments, if the aggregation group link is down when aggregation device 102 is brought back online, aggregation device 102 will execute instructions to send a LLDP message with Aggregation Status bit set to "1" to downstream nodes 106-1-106-N on the assumption that the other aggregation devices, such as aggregation device 104 is also down.

Downstream nodes 106-1-106-N reactivate the port coupled to aggregation device 102 and adds that port back to the aggregation group, but does not yet enable transmit on the port, but will enable receive on this port. Downstream nodes 106-1-106-N then send an LLDP message with Aggregation Status bit status set to "1". Aggregation device then receives these LLDP messages (step 310). After receiving these messages from all downstream nodes 106-1-106-N, aggregation device 102 confirms whether all ports of the aggregation group are blocked from interchassis link information in other aggregation devices, for example, aggregation device 104. This is to ensure that when aggregation device 102 starts sending data to downstream nodes 106-1 to 106-N, there is no duplication of data with both 102 and 104 sending the same packet to the downstream nodes. If the ports are blocked from interchassis link information in the other aggregation devices, aggregation device 102 may then enable information transmission on all ports and will send a LLDP message with Aggregations Status bit set to "1" to downstream nodes 106-1-106-N as an acknowledgment that aggregation device 102 is online and able to transmit information in the aggregation group (step 312). Once this acknowledgement message has been received, downstream nodes 106-1-106-N enable information transmission on the port coupled to aggregation device 102 and information is then hashed to aggregation device 102 (step 314).

Consistent with some embodiments, if aggregation device 102 does not receive LLDP messages with Aggregation Status bit set to "1" after rebooting from all of downstream nodes 106-1-106-N, aggregation device 102 will execute instructions to set a timer to wait for a response from downstream nodes 106-1-106-N that have not responded. If the timer expires, aggregation device proceeds to send a LLDP message with Aggregations Status bit set to "1" to downstream nodes 106-1-106-N as an acknowledgment that aggregation device 102 is online and able to transmit information in the aggregation group (step 312). Consistent with some embodiments, after aggregation device 102 is stably and consistently transmitting information across the group, other aggregation devices, such as aggregation device 104, may be subsequently taken offline for upgrades and rebooted. Although the method described in FIG. 3 is applied to aggregation device 102, it could be applied to aggregation device 104, or any aggregation device in an aggregate group that is being taken offline.

Figure 5:
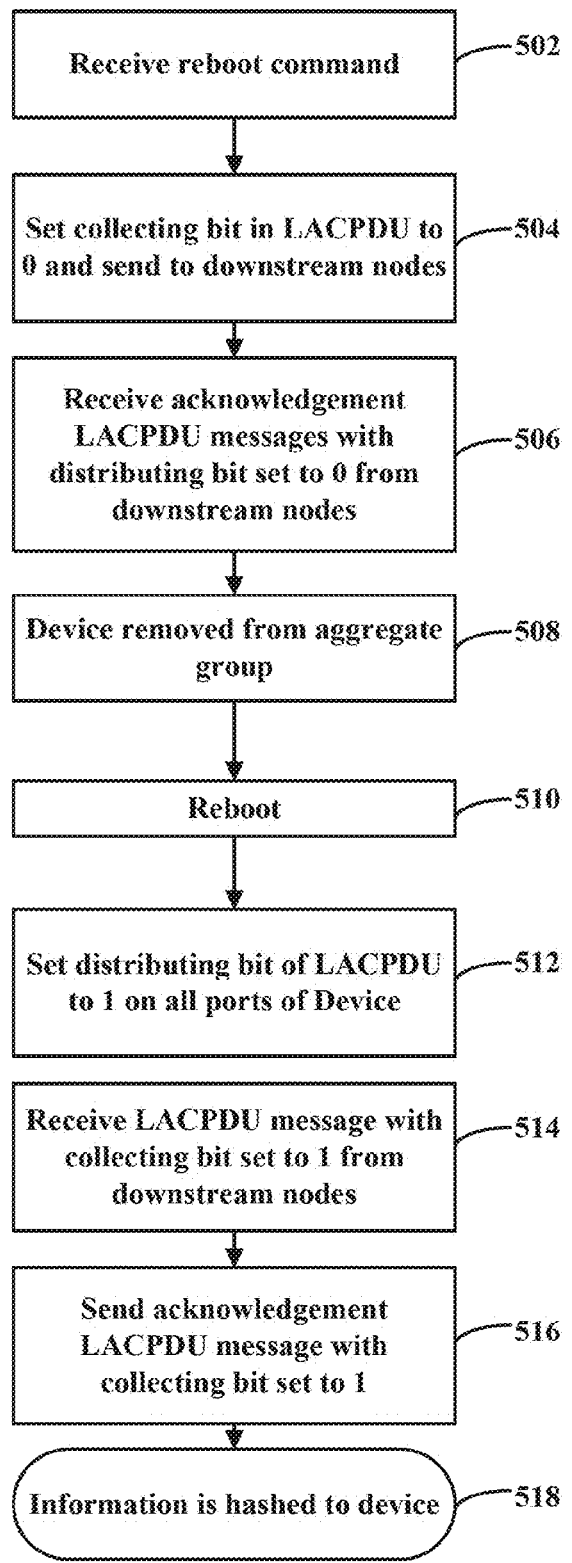
FIG. 5 is a flowchart illustrating a method for routing information in an aggregated information handling system to prevent information loss using LACP, consistent with some embodiments.

FIG. 5 is a flowchart illustrating a method for routing information in an aggregated information handling system to prevent information loss using LACP, consistent with some embodiments. FIG. 5 will be described in conjunction with information handling system 100 shown in FIG. 1 for illustration purposes. The method shown in FIG. 5 is directed to the method performed by the aggregation device 102 that is taken offline. Consistent with some embodiments, aggregation device 102 may include a memory storing instructions that, when executed by a processor of aggregation device 102, allow aggregation device 102 to perform a method such as shown in FIG. 5. As shown in FIG. 5, aggregation device 102 receives a reboot command (step 502). Consistent with some embodiments, the reboot command may be received by aggregation device 102 as a step in an upgrade process. In other embodiments, the reboot command may be received to bring aggregation device 102 back online after it has gone down or offline. Once aggregation device 102 has received the reboot command, it will use LACP to inform downstream nodes 106-1-106-N to reroute information to other aggregation devices such as aggregation device 104. To do this, aggregation device 102 sends an LACPDU message with the collecting bit set to "0" to all downstream nodes 106-1-106-N (step 504). This provides an indication that aggregation device 102 will be unable to receive any data from downstream nodes 106-1-106-N.

Figure 6:
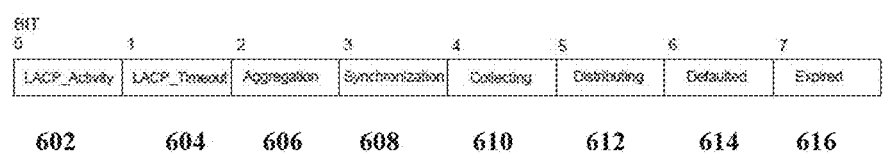
FIG. 6 is a LACPDU, consistent with some embodiments.

FIG. 6 illustrates a LACPDU word 600, consistent with some embodiments. LACPDUs include information about the state of the actor encoded as individual bits, which will be either a "1" or a "0". As shown in FIG. 6, the individual bits include LACP_Activity 602, LACP_Timeout 604, Aggregation 606, Synchronization 608, Collecting 610, Distributing 612, Defaulted 614, and Expired 616. The state of LACP_Activity bit 602 can be active (i.e. a "1") or passive (i.e., a "0"). In an active state, the actor will always send LACPDUs, while in a passive state, the actor will only send LACPDUs in response to receiving another LACPDU. The state of LACP_Timeout bit 604 can be long or short, referring to the time to wait before sending LACPDUs. The state of aggregation bit 606 can be individual, if it can only form an aggregation with itself, or aggregatable, if it can form an aggregation with other ports. The state of synchronization bit 608 can be IN_SYNC_if synchronized with partner or OUT_OF_SYNC if not synchronized with a partner. The state of collecting bit 610 can be enabled if receiving packets or disabled if not receiving packets. The state of distributing bit 612 can be enabled if sending packets or disabled if not sending packets. The state of defaulted bit 614 can be TRUE if the actor is using defaulted values for a partner's information or FALSE if not. The state of expired bit 616 can be TRUE if the actor is operating in expired mode or FALSE if not.

Returning to FIG. 5, when downstream nodes 106-1-106-N receive the LACPDU with the collecting but set to "0" from aggregation device 102, downstream nodes 106-1-106-N stop transmission to aggregation device 102, though it will continue to receive traffic from device 102 on these ports. Consistent with some embodiments, downstream nodes 106-1-106-N include a memory that includes a table for storing a record of which ports and which aggregation devices information is being transmitted to. In such embodiments, downstream nodes 106-1-106-N update the table to indicate that information is not to be transmitted to aggregation device 102. Aggregation device 102 then receives an LACPDU from downstream units 106-1-106-N having the distributing bit set to "0" (step 506). Once aggregation device 102 has received LACPDUs having a distributing bit set to "0" from all downstream nodes 106-1-106-N, aggregation device 102 is removed from aggregate group (step 508) goes offline and can reboot (step 510). After the reboot is complete and aggregation device 102 comes back online, aggregation device 102 sets the collecting bit of the LACPDU to "0-" and the distributing bit of the LACPDU to "1" indicating that it is willing transmit information to the downstream nodes, but not receive information, and sends this message to downstream nodes 106-1-106-N (step 512). Downstream nodes 106-1-106-N then send an LACPDU having the collecting bit set to "1" and the distributing bit set to "0", indicating that they are willing to receive data but not transmit data on these ports of the aggregation. Aggregation device 102 receives these LACPDUs from downstream nodes 106-1-106-N (step 514). After receiving these messages from all downstream nodes 106-1-106-N, aggregation device 102 confirms whether all ports of the aggregation group are blocked from interchassis link information in other aggregation devices, for example, aggregation device 104. If the ports are blocked from interchassis link information in the other aggregation devices, aggregation device 102 may then enable information transmission on all ports and will send a LACPDU having the collecting bit set to "1" to downstream nodes 106-1-106-N as an acknowledgment that aggregation device 102 is online and able to receive information in the aggregation group (step 516). Once this acknowledgement message has been received, downstream nodes 106-1 to 106-N send LACPDU with distributing bit set to 1 indicating downstream nodes 106-1-106-N enable information transmission on the port coupled to aggregation device 102 and information is then hashed to aggregation device 102 (step 518). Although the method described in FIG. 5 is applied to aggregation device 102, it could be applied to aggregation device 104, or any aggregation device in an aggregate group that is being taken offline.

Figure 7:
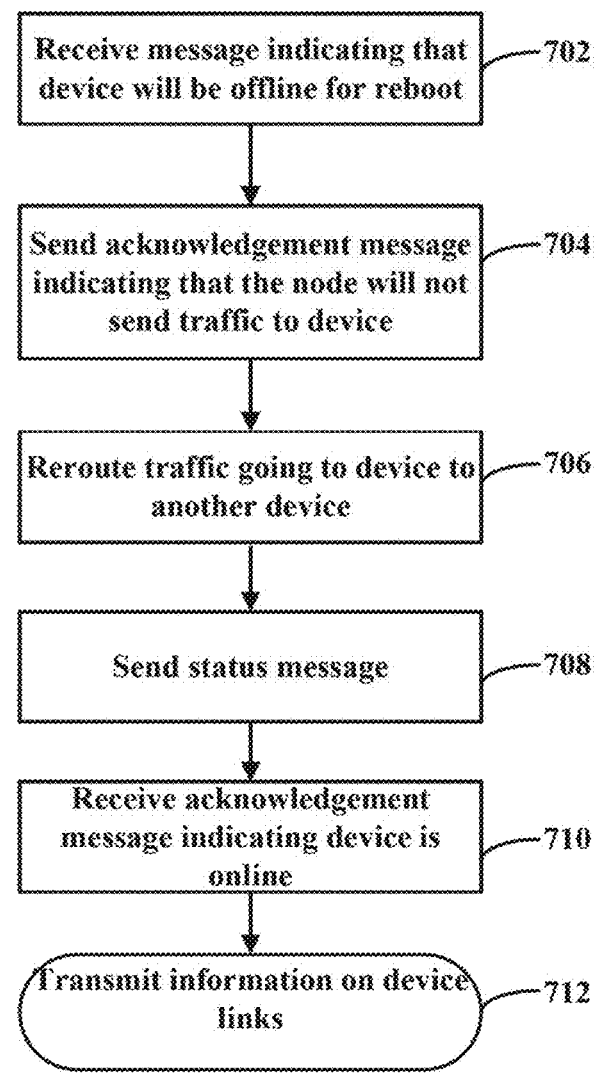
FIG. 7 is method for routing information in an aggregated information handling system to prevent information loss, consistent with some embodiments.

FIG. 7 is method for routing information in an aggregated information handling system to prevent information loss, consistent with some embodiments. FIG. 7 will be described in conjunction with information handling system 100 shown in FIG. 1 for illustration purposes. The method shown in FIG. 7 is directed to the method performed by one of downstream nodes 106-1-106-N, for example, downstream node 106-1. Consistent with some embodiments, downstream nodes 106-1-106-N may include a memory storing instructions that, when executed by a processor of downstream nodes 106-1-106-N, allow downstream nodes 106-1-106-N to perform a method such as shown in FIG. 7. As discussed in conjunction with FIG. 2, above, when a aggregation device, such as aggregation device 102 is going to go offline and reboot, aggregation device 102 sends out messages that the unit will be going offline. Downstream node 106-1 receives a message that aggregation device 102 will be going offline for a reboot (step 702). After receiving the message from aggregation device 102 downstream node 106-1 will send an acknowledgement message indicating that downstream node 106-1 will not send information to aggregation device 102 that is going offline (step 704). Downstream node 106-1 then reroutes information going to aggregation device 102 to another aggregation device, such as aggregation device 104 (step 706). Downstream node 106-1 then sends a status message indicating that it is ready to receive data from aggregation device 102 (step 708). Aggregation device 102 comes back online and receives the status message from downstream node 106-1 indicating that downstream node 106-1 is ready to receive data from the aggregation device 102. After receiving a status message from all downstream nodes 106-1-106-N or on the expiry of a timer, aggregation device 102 will send an acknowledgement message to all downstream nodes 106-1-106-N. Downstream node 106-1 receives the acknowledgment message from aggregation device 102 indicating that aggregation device 102 is online (step 710). Once downstream node 106-1 receives the acknowledgment message from aggregation device 102, downstream node 106-1 begins transmitting information on a link coupled to aggregation device 102 (step 712). Although the method described in FIG. 7 is applied to downstream node 106-1, it could be applied to any or all of downstream nodes 106-1-106-N.

Figure 8:
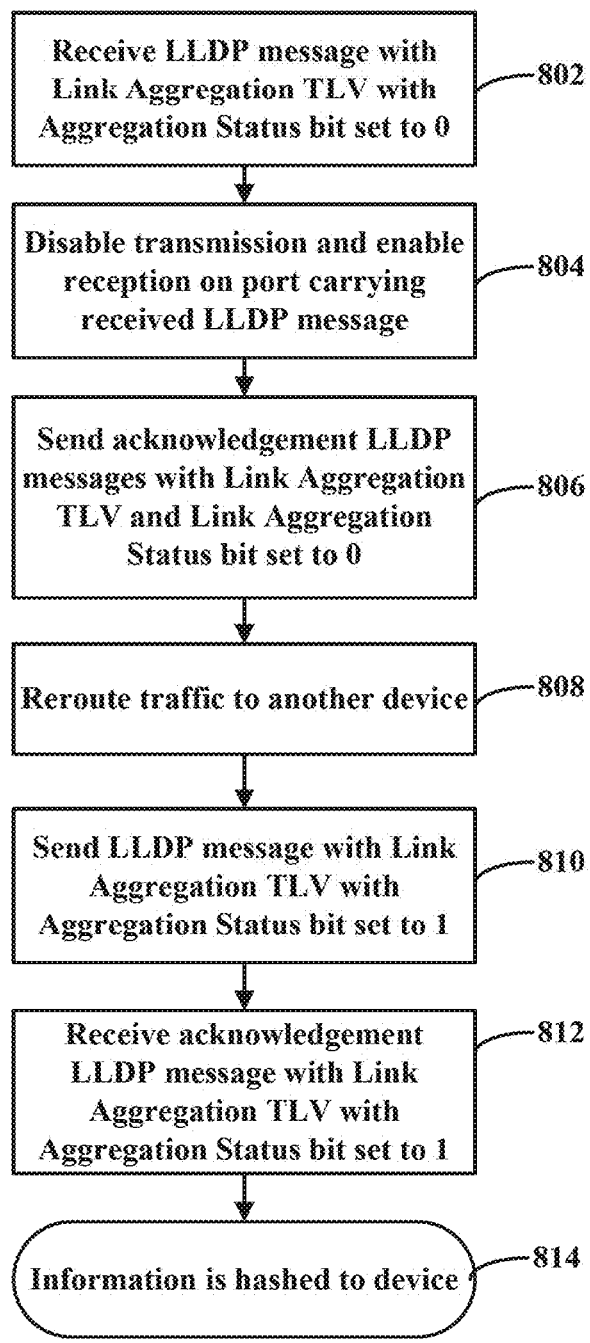
FIG. 8 is a flowchart illustrating a method for routing information in an aggregated information handling system to prevent information loss using LLDP, consistent with some embodiments.

Consistent with some embodiments and similar to the methods described in FIG. 2, the method described in FIG. 7 may be implemented using link layer discovery protocol (LLDP) or link aggregation control protocol (LACP). FIG. 8 is a flowchart illustrating a method for routing information in an aggregated information handling system to prevent information loss using LLDP, consistent with some embodiments. FIG. 8 will be described in conjunction with information handling system 100 shown in FIG. 1 for illustration purposes. The method shown in FIG. 8 is directed to the method performed by downstream nodes 106-1-106-N, such as downstream node 106-1. Consistent with some embodiments, downstream node 106-1 may include a memory storing instructions that, when executed by a processor of downstream node 106-1, allow downstream node 106-1 to perform a method such as shown in FIG. 8. As discussed above with respect to FIG. 4, when aggregation device 102 prepares to go offline and reboot, aggregation device will send an LLDP message with a Link Aggregation TLV with Aggregation Status bit set to "0". Downstream node 106-1 receives this message (step 802). Upon receipt of the LLDP message, downstream node 106-1 disables information transmission on the port carrying the LLDP message while reception of information remains enabled to receive any transient information from aggregation device 102 before it goes offline (step 804). The port on which the LLDP message is received will be able to receive information to receive any transient information from aggregation device 102 it goes offline, preventing source suppression and flooding to other members of the aggregation group. Downstream node 106-1 then sends acknowledgement messages back to aggregation device 102, the acknowledgement messages also being LLDPDU messages with link aggregation TLV and a link aggregation bit set to "0" (step 806). Downstream node then lag hashes the information on another port coupled to another aggregation device, for example, aggregation device 104 effectively routing all information that would have gone to aggregation device 102 to aggregation device 104 (step 808). Downstream node 106-1 reactivates the port coupled to aggregation device 102 and adds that port back to the aggregation group, but does not yet enable transmit on the port. Downstream node 106-1 then sends an LLDP message with Aggregation Status bit status set to "1" to aggregation device 102 (step 810). Aggregation device 102 then receives these LLDP messages and will send a LLDP message with Aggregations Status bit set to "1" to downstream nodes 106-1-106-N as an acknowledgment that aggregation device 102 is online and able to transmit information in the aggregation group. Downstream node 106-1 receives this acknowledgement LLDP message (step 812) and enables transmission on the port coupled to aggregation device 102 and information is then hashed to aggregation device 102 so that information is transmitted to aggregation device 102 (step 814). Although the method described in FIG. 8 is applied to downstream node 106-1, it could be applied to any or all of downstream nodes 106-1-106-N.

Figure 9:
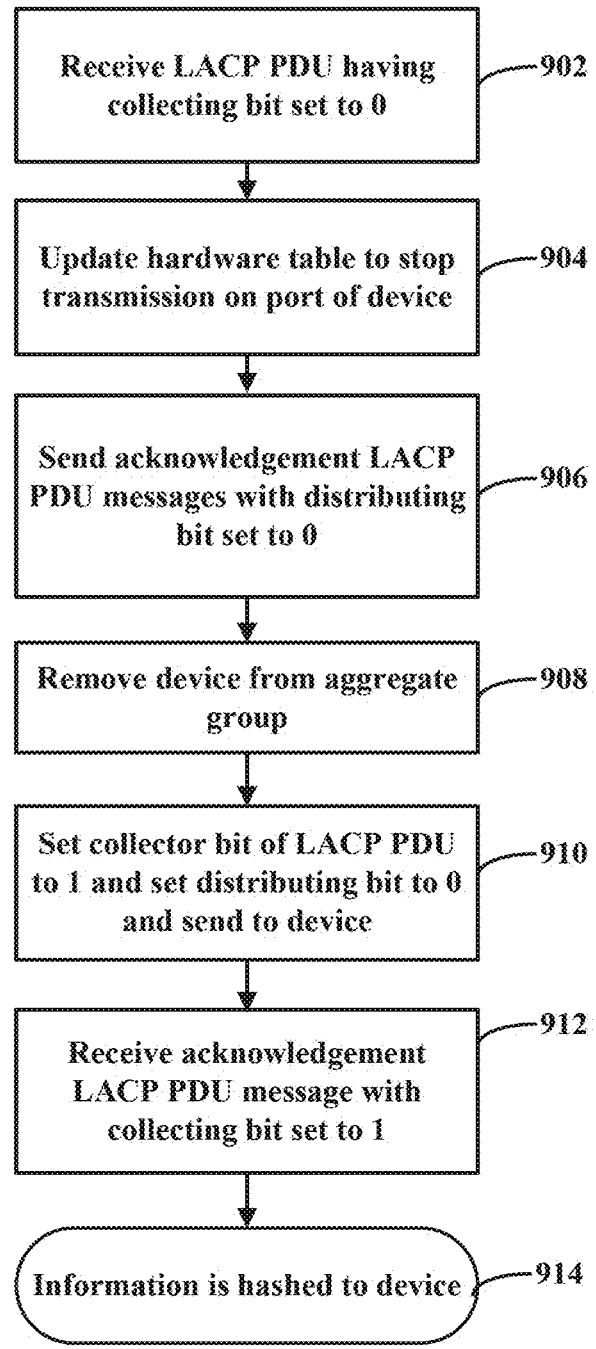
FIG. 9 is a flowchart illustrating a method for routing information in an aggregated information handling system to prevent information loss using LACP, consistent with some embodiments.

FIG. 9 is a flowchart illustrating a method for routing information in an aggregated information handling system to prevent information loss using LACP, consistent with some embodiments. FIG. 9 will be described in conjunction with information handling system 100 shown in FIG. 1 for illustration purposes. The method shown in FIG. 9 is directed to the method performed by downstream nodes 106-1-106-N, for example, downstream node 106-1. Consistent with some embodiments, downstream node 106-1 may include a memory storing instructions that, when executed by a processor of downstream node 106-1, allow downstream node 106-1 to perform a method such as shown in FIG. 5. As discussed above with respect to FIG. 5, when a aggregation device, such as aggregation device 102, will be taken offline for rebooting, it will use LACP to inform downstream node 106-1 to reroute information to other aggregation devices such as aggregation device 104. Downstream nodes 106-1 receives an LACPDU message with the collecting bit set to "0" to all providing an indication that aggregation device 102 will be unable to receive any data from downstream node 106-1 (step 902). When downstream node 106-1 receives the LACPDU with the collecting but set to "0" from aggregation device 102, downstream node 106-1 stops transmission to aggregation device 102 and updates a table for storing a record of which ports and which aggregation devices information is being transmitted to indicate that information is not to be transmitted to aggregation device 102 (step 904). Downstream unit 106-1 then sends an acknowledgement LACPDU to aggregation device 102 having the distributing bit set to "0" (step 906). Aggregation device 102 is then removed from the aggregate group, and information is not routed to aggregation device 102 (step 908). Consistent with some embodiments, information that would have been routed to aggregation device 102 is now routed to another aggregation device such as aggregation device 104. Downstream nodes 106-1 then sends an LACPDU having the collecting bit set to "1" and the distributing bit set to "0" to aggregation device 102 (step 910). After aggregation device 102 receiving these messages from all downstream nodes 106-1-106-N, aggregation device 102 may then enable information transmission on all ports and will send an acknowledgment message. Downstream node 106-1 receives a LACPDU message having the collecting bit set to "1" as an acknowledgment that aggregation device 102 is online and able to transmit information in the aggregation group (step 912). After receiving this acknowledgement message, downstream node 106-1 will add aggregation device 102 back to the aggregation group and begin lag hashing information to aggregation device 102 so that information is transmitted to aggregation device 102 (step 914). Although the method described in FIG. 9 is applied to downstream node 106-1, it could be applied to any or all of downstream nodes 106-1-106-N.

Consistent with embodiments described herein, there is provided a system and method that can minimize or eliminate information loss in an aggregation group when one of the aggregation devices temporarily goes offline. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A switch comprising:
a memory for storing instructions;
a processor to read and execute the instructions;
a first port coupling the switch to a first device; and
a second port coupling the switch to a second device, the first device and the second device belonging to an aggregation group;
wherein the switch is configured to:
receive a first message from the first device, the first message comprising a protocol field set to indicate that the first device is going offline;
transmit a second message to the first device, the second message comprising a protocol field set to indicate that the switch will not send any data to the first device, but will still receive data from the first device;
redirect, after transmitting the second message, data to be forwarded to the first device to the second device;
receive a third message from the first device, the third message comprising a protocol field set to indicate that the first device is back online and is ready to receive data; and
direct, after receiving the third message, data to be forwarded to the first device to the first device.

2. The switch of claim 1, wherein the switch is further configured to periodically retransmit the second message to the first device while redirecting data to the second device.

3. The switch of claim 1, wherein:
the first message comprises a link layer discovery protocol (LLDP) message with a LLDP type length value (TLV) aggregation status bit set to zero;
the second message comprises a LLDP message with a LLDP TLV aggregation status bit set to zero; and the third message comprises a LLDP message with a LLDP TLV aggregation status bit set to one.

4. The switch of claim 1, wherein:
the first message comprises a link aggregation control protocol data unit (LACPDU) with a collecting bit set to zero;
the second message comprises a LACPDU with distributing bit set to zero; and
the third message comprises a LACPDU with a collecting bit set to one.

5. The switch of claim 1, wherein the switch is further configured to transmit, after receiving the third message and before directing data to the first device, a fourth message to the first device, the fourth message indicating that the switch is ready to send data to the first device.

6. The switch of claim 5, wherein the fourth message comprises a LLDP message with a LLDP TLV aggregation status bit set to 1.

7. The switch of claim 5, wherein the fourth message comprises a LACPDU with a distributing bit set to 1.

8. A first switch, comprising:
a memory for storing instructions;
a processor to read and execute the instructions;
a first port coupling the first switch to a second switch, the first switch and the second switch being in an aggregation group; and
one or more second ports coupling the first switch to one or more nodes;
wherein the first switch is configured to:
transmit a corresponding first message to each of the nodes, each corresponding first message comprising a protocol field set to indicate that the first switch is going offline;
receive a corresponding second message from each of the nodes, each corresponding second message comprising a protocol field set to indicate that a respective one of the nodes will not send any data to the first switch;
go offline after receiving the corresponding second message from each of the nodes;
come online;
receive, after coming online, a corresponding third message from each of the nodes, each corresponding third message comprising a respective protocol field set to indicate that the respective one of the nodes is ready to receive data from the first switch; and
transmit a corresponding fourth message to each of the nodes after receiving the corresponding third message from each of the nodes, each corresponding fourth message comprising a respective protocol field set to indicate that the first switch is back online and is ready to receive data.

9. The first switch of claim 8, wherein:
each corresponding first message comprises a link layer discovery protocol (LLDP) message with a LLDP type length value (TLV) aggregation status bit set to zero;
each corresponding second message comprises a LLDP message with a LLDP TLV aggregation status bit set to zero;
each corresponding third message comprises a LLDP message with a LLDP TLV aggregation status bit set to one; and
each corresponding fourth message comprises a LLDP message with a LLDP TLV aggregation status bit set to one.

10. The first switch of claim 8, wherein:
each corresponding first message comprises a link aggregation control protocol data unit (LACPDU) with a collecting bit set to zero;
each corresponding second message comprises a LACPDU with distributing bit set to zero;
each corresponding third message comprises a LACPDU with a collecting bit set to one and a distributing bit set to zero; and
each corresponding fourth message comprises a LACPDU with a collecting bit set to one.

11. The first switch of claim 8, wherein the first switch is further configured to transmit, after coming online and before receiving any corresponding third message, a corresponding fifth message to each of the nodes indicating that the first switch is back online.

12. The first switch of claim 11, wherein the corresponding fifth message comprises a LLDP message with a LLDP TLV aggregation status bit set to one.

13. The first switch of claim 11, wherein the corresponding fifth message comprises a LACPDU with a collecting bit set to zero and a distributing bit set to one.

14. The first switch of claim 8, wherein the first switch is further configured to receive corresponding fifth messages from each of the nodes, each corresponding fifth message acknowledging a corresponding fourth message.

15. The first switch of claim 14, wherein each of the corresponding fifth messages comprises a LACPDU with a distributing bit set to 1.

16. An information handling system comprising:
a first switch having a first memory for storing first instructions and a first processor to read and execute the first instructions; and
a second switch having a second memory for storing second instructions and a second processor to read and execute the second instructions, the second switch being a peer of the first switch;
wherein the first switch and the second switch are both coupled to one or more nodes,
each comprising a memory for storing instructions; and a processor to read and execute the instructions;
wherein the first switch is configured to:
transmit a corresponding first message to each of the nodes, each corresponding first message comprising a respective protocol field set to indicate that the first switch is going offline;
receive a corresponding second message from each of the nodes, each corresponding second message comprising a respective protocol field set to indicate that a respective one of the nodes will not send any data to the first switch;
go offline after receiving the corresponding second message from each of the nodes;
come online;
receive, after coming online, a corresponding third message from each of the nodes, each corresponding third message comprising a respective protocol field set to indicate that the respective one of the nodes is ready to receive data from the first switch; and
transmit a corresponding fourth message to each of the nodes after receiving the corresponding third message from each of the nodes, each corresponding fourth message comprising a respective protocol field set to indicate that the first switch is back online and is ready to receive data;
wherein the second switch is configured to receive network traffic on behalf of the first switch from each of the nodes while the first switch is offline.

17. The information handling system of claim 16, wherein:
each corresponding first message comprises a link layer discovery protocol (LLDP) message with a LLDP type length value (TLV) aggregation status bit set to zero;
each corresponding second message comprises a LLDP message with a LLDP TLV aggregation status bit set to zero;
each corresponding third message comprises a LLDP message with a LLDP TLV aggregation status bit set to one; and
each corresponding fourth message comprises a LLDP message with a LLDP TLV aggregation status bit set to one.

18. The information handling system of claim 16, wherein:
each corresponding first message comprises a link aggregation control protocol data unit (LACPDU) with a collecting bit set to zero;
each corresponding second message comprises a LACPDU with distributing bit set to zero;
each corresponding third message comprises a LACPDU with a collecting bit set to one and a distributing bit set to zero; and
each corresponding fourth message comprises a LACPDU with a collecting bit set to one.

19. The information handling system of claim 16, wherein the first switch is further configured to transmit, after coming online and before receiving any corresponding third message, a corresponding fifth message to each of the nodes indicating that the first switch is back online.

20. The information handling system of claim 16, wherein the first switch is further configured to receive corresponding fifth messages from each of the nodes, each corresponding fifth message acknowledging a corresponding fourth message.

* * * * *